(12) United States Patent
Bogaki et al.

(10) Patent No.: US 11,375,078 B2
(45) Date of Patent: Jun. 28, 2022

(54) OPTICAL LINEAR SENSOR UNIT

(71) Applicants: GLORY LTD., Himeji (JP); VIENEX CORPORATION, Kanonji (JP)

(72) Inventors: Akira Bogaki, Himeji (JP); Masashi Nishikawa, Himeji (JP); Yasutoshi Hayashi, Kanonji (JP); Kazuaki Ryuman, Kanonji (JP)

(73) Assignees: GLORY LTD, Kagawa (JP); VIENEX CORPORATION, Kagawa (JP)

( * ) Notice: Subject to any disclaimer, the term of this patent is extended or adjusted under 35 U.S.C. 154(b) by 200 days.

(21) Appl. No.: 16/652,654

(22) PCT Filed: Sep. 13, 2018

(86) PCT No.: PCT/JP2018/033983
§ 371 (c)(1),
(2) Date: Mar. 31, 2020

(87) PCT Pub. No.: WO2019/077917
PCT Pub. Date: Apr. 25, 2019

(65) Prior Publication Data
US 2020/0244834 A1 Jul. 30, 2020

(30) Foreign Application Priority Data
Oct. 19, 2017 (JP) .............................. JP2017-202491

(51) Int. Cl.
*H04N 1/03* (2006.01)
*G01J 1/04* (2006.01)
(Continued)

(52) U.S. Cl.
CPC .......... *H04N 1/0306* (2013.01); *G01J 1/0414* (2013.01); *G01J 1/0488* (2013.01); *G01J 1/42* (2013.01); *H04N 1/02895* (2013.01)

(58) Field of Classification Search
CPC . H04N 1/0306; H04N 1/02895; G01J 1/0414; G01J 1/0488; G01J 1/42; G07D 7/12; G07D 7/121; G02B 5/22; G02B 5/28
See application file for complete search history.

(56) References Cited

U.S. PATENT DOCUMENTS 5,161,233 A * 11/1992 Matsuo .................... G03G 5/02
355/77
5,471,281 A * 11/1995 Hayashi ............. H04N 1/40056
399/221
(Continued)

FOREIGN PATENT DOCUMENTS

JP 2006177954 A * 7/2006 ................ G01J 3/02
JP 2007-81696 3/2007
(Continued)

OTHER PUBLICATIONS

PCT/JP2018/033983, International Search Report and Written Opinion dated Dec. 11, 2018, 6 pages—English, 7 pages—Japanese.
(Continued)

*Primary Examiner* — Mohamed K Amara
(74) *Attorney, Agent, or Firm* — Andrew F. Young; Nolte Lackenbach Siegel

(57) ABSTRACT

A reflective member is disposed on the optical path from the linear light source to the lens array. An ultraviolet light blocking filter is provided closer to a light-receiving unit than the reflective member. A color filter is provided closer to the light-receiving unit than the ultraviolet light blocking filter. A light-receiving surface of the light-receiving unit has a first region opposed to the reflective member without the ultraviolet light blocking filter and the color filter interposed therebetween, a second region opposed to the reflective member and the ultraviolet light blocking filter without the color filter interposed therebetween, and a third region
(Continued)

opposed to the reflective member, the ultraviolet light blocking filter, and the color filter.

8 Claims, 13 Drawing Sheets

(51) Int. Cl.
    *G01J 1/42*     (2006.01)
    *H04N 1/028*     (2006.01)

(56) References Cited

U.S. PATENT DOCUMENTS

| | | | | |
|---|---|---|---|---|
| 6,094,281 | A * | 7/2000 | Nakai | H04N 1/028 |
| | | | | 358/512 |
| 6,256,407 | B1 * | 7/2001 | Mennie | G07D 7/162 |
| | | | | 382/135 |
| 8,884,187 | B2 * | 11/2014 | Nakatate | G02B 13/22 |
| | | | | 219/130.01 |
| 2004/0129893 | A1 * | 7/2004 | Usami | G07D 7/1205 |
| | | | | 250/461.1 |
| 2011/0064279 | A1 * | 3/2011 | Uno | G07D 7/183 |
| | | | | 382/112 |
| 2018/0096553 | A1 * | 4/2018 | Horiguchi | G02B 5/22 |

FOREIGN PATENT DOCUMENTS

| | | | | |
|---|---|---|---|---|
| JP | WO2007040246 | A1 * | 4/2009 | ......... G02B 27/0018 |
| JP | 2011-118566 | | 6/2011 | |
| JP | 2012190253 | A * | 10/2012 | ............... G02B 5/22 |
| JP | 5297930 | B2 * | 9/2013 | ........... G01N 21/956 |
| JP | 2016-005093 | | 1/2016 | |
| JP | 2016-66874 | | 4/2016 | |
| JP | 2016-149769 | | 8/2016 | |
| JP | 6162315 | B1 * | 7/2017 | ........... H04N 1/0306 |
| WO | WO2016/158840 | A1 | 10/2016 | |

OTHER PUBLICATIONS

EP Appln. No. 18868923.6, Extended European Search Report dated Jun. 16, 2021, 7 pages—English.

* cited by examiner

OPTICAL LINEAR SENSOR UNIT

CROSS REFERENCE TO RELATED APPLICATIONS

This application relates to and claims priority as a § 371 national phase, from PCT/JP2018/033983 filed Sep. 13, 2018, the entire contents of which are incorporated herein by reference, which in turn claims priority from JP 2017-202491 filed Oct. 19, 2017.

TECHNICAL FIELD

The present invention relates to an optical linear sensor unit including a linear light source for use as an illumination light source that illuminates paper sheets such as bills and securities.

FIGURE SELECTED FOR PUBLICATION

FIG. 5

BACKGROUND ART

Identification systems for determining the authenticity of paper sheets are provided with an optical linear sensor unit including a linear light source that illuminates paper sheets and a light-receiving unit that receives light from the illuminated paper sheets. The linear light source includes, for example, an ultraviolet light source and a visible light source, such that the linear light source can selectively emit ultraviolet light or visible light. In addition, some optical linear sensor units can emit not only ultraviolet light and visible light but also infrared light.

In a case where a paper sheet is irradiated with visible light, the light reflected at the paper sheet or the light transmitted through the paper sheet enters the light-receiving unit through a color filter. The color filter is intended to transmit visible light in a specific wavelength range, and visible light of each color of RGB is transmitted through the color filter, and received at the light-receiving unit, thereby allowing a color image of the paper sheet to be obtained, based on the intensity of the light of each color of RGB received in the light-receiving unit.

On the other hand, in a case where a paper sheet is irradiated with ultraviolet light, the phosphor contained in the paper sheet produces fluorescence through ultraviolet light illumination, and the fluorescence enters the light-receiving unit through the color filter. This makes it possible to acquire a fluorescence image of the paper sheet, based on the intensity of light received in the light-receiving unit. In the case of irradiating a paper sheet with ultraviolet light, the near side of the color filter (the side opposite to the light-receiving unit) is provided with an ultraviolet light blocking filter in order to prevent the detection accuracy of fluorescence from being decreased by ultraviolet light incidence on the light-receiving unit.

In this type of optical linear sensor, the amount of light emitted in the ultraviolet light source may vary due to a change in temperature or the like. Accordingly, a configuration is proposed in which a fluorescent member (white reference plate) that produces fluorescence when the member is irradiated with ultraviolet light is provided in a reading region of a light-receiving unit and outside an image region in which an image of a paper sheet is read (for example, see Patent Document 1 below). In accordance with this configuration, the image of the paper sheet can be corrected, based on the amount of fluorescence received from the fluorescent member in the light-receiving unit and the reference data stored in advance in the reference data storage unit.

PRIOR ART DOCUMENT

Patent Document

Patent Document 1: JP-A-2016-5093

SUMMARY OF THE INVENTION

Problems to be Solved by the Invention

The fluorescent member may, however, deteriorate due to long-term use, and the amount of fluorescence may change in a case where the fluorescent member is irradiated with ultraviolet light. In such a case, it is not possible for the amount of ultraviolet light from the ultraviolet light source to be measured with high accuracy, and there has been thus a problem that it is not possible to correct the image of the paper sheet in a favorable manner.

Accordingly, the inventors have considered that without producing fluorescence by irradiating a fluorescent member with ultraviolet light, ultraviolet light is reflected at a reflective member, and then received directly by a light-receiving unit, thereby correcting an image of a paper sheet, based on the amount of the ultraviolet light. In this case, it is necessary to adopt such a configuration in which no ultraviolet light blocking filter is disposed at least between the reflective member and the light-receiving unit. In this case, however, a color filter is irradiated with ultraviolet light, and there is thus a problem that the color filter is deteriorated.

The present invention has been achieved in view of the circumstances mentioned above, and an object of the present invention is to provide an optical linear sensor unit which is capable of measuring the amount of ultraviolet light in an ultraviolet light source without using any fluorescent member, and preventing deterioration of a color filter due to ultraviolet light.

Means for Solving the Problems

An optical linear sensor unit according to the present invention includes at least a linear light source, a lens array, a light-receiving unit, a reflective member, an ultraviolet light blocking filter, and a color filter. The linear light source has an ultraviolet light source and a visible light source, for use as an illumination light source that illuminates a paper sheet. The lens array guides light from the illuminated paper sheet. The light-receiving unit receives, at a light-receiving surface thereof, light passing through the lens array. The reflective member is disposed on an optical path from the linear light source to the lens array, and provided within a reading region of the light-receiving unit and outside an image region in which an image of a paper sheet is read. The ultraviolet light blocking filter is provided closer to the light-receiving unit than the reflective member, and configured to block ultraviolet light from entering the light-receiving unit. The color filter is provided closer to the light-receiving unit than the ultraviolet light blocking filter, and configured to allow visible light in a specific wavelength range to pass through the color filter and enter the light-receiving unit.

The light-receiving surface of the light-receiving unit has a first region, a second region, and a third region. The first region is opposed to the reflective member without the ultraviolet light blocking filter and the color filter interposed therebetween. The second region is opposed to the reflective member and the ultraviolet light blocking filter without the color filter interposed therebetween. The third region is opposed to the reflective member, the ultraviolet light blocking filter, and the color filter.

In accordance with this configuration, in the case of ultraviolet light irradiation from the ultraviolet light source, the ultraviolet light reflected at the reflective member enters the first region of the light-receiving surface of the light-receiving unit, thus allowing the amount of ultraviolet light in the ultraviolet light source to be measured without using any fluorescent member, based on the amount of ultraviolet light received in the first region. Furthermore, in the case of visible light irradiation from the visible light source, the visible light reflected at the reflective member enters the third region of the light-receiving surface of the light-receiving unit through the color filter, thus allowing the amount of visible light in the visible light source to be measured, based on the amount of visible light received in the third region.

In the case of ultraviolet light irradiation from the ultraviolet light source, the ultraviolet light reflected at the reflective member enters the first region of the light-receiving surface of the light-receiving unit without passing through the color filter. Thus, the color filter can be prevented from being deteriorated by ultraviolet light. In particular, between the first region and the third region, the second region opposed to the reflective member and the ultraviolet light blocking filter is provided without the color filter interposed therebetween, thus making it possible to prevent ultraviolet light from reaching the color filter opposed to the third region, and making it possible to ensure that the color filter is prevented from being deteriorated by ultraviolet light.

The reflective member may be provided at a position opposed to at least one end for each of the ultraviolet light blocking filter and the color filter. In this case, respective ends of the ultraviolet light blocking filter and the color filter may be provided at positions shifted from each other in a direction parallel to the light-receiving surface, thereby forming the second region between the respective ends.

In accordance with this configuration, the simple configuration obtained just by providing the respective ends of the ultraviolet light blocking filter and color filter at positions shifted from each other in a direction parallel to the light-receiving surface allows the second region to be easily formed between the respective ends. Thus, the simple configuration allows the color filter to be reliably prevented from being deteriorated by ultraviolet light.

The lens array has an aperture angle that transmits light incident within a predetermined angle range. In this case, the respective ends of the ultraviolet light blocking filter and the color filter are preferably provided at positions shifted from each other in a direction parallel to the light-receiving surface, such that a straight line connecting the respective ends is equal to or larger than the predetermined angle range with respect to a direction orthogonal to the light-receiving surface.

In accordance with this configuration, ultraviolet light that enters the lens array at an angle that allows for reaching the end of the color filter does not pass through the lens array, thus allowing the color filter to be reliably prevented from being deteriorated by the ultraviolet light.

The predetermined angle range is preferably 10° to 20°.

The optical linear sensor unit may further include an ultraviolet light reference data storage unit and a first image correction processing unit. The ultraviolet light reference data storage unit stores, as ultraviolet light reference data, an amount of light received in the light-receiving unit in a case where a reference amount of ultraviolet light is reflected at the reflective member to enter the first region. The first image correction processing unit corrects an image obtained by irradiating a paper sheet with the ultraviolet light, based on an amount of ultraviolet light received in the first region of the light-receiving unit, and the ultraviolet light reference data stored in the ultraviolet light reference data storage unit.

In accordance with this configuration, ultraviolet light is reflected at the reflective member, and received by the first region of the light-receiving unit, thereby making it possible to correct, in a favorable manner, the image obtained by irradiating a paper sheet with the ultraviolet light, based on the amount of light received and the ultraviolet light reference data.

The optical linear sensor unit may further include a visible light reference data storage unit and a second image correction processing unit. The visible light reference data storage unit stores, as visible light reference data, an amount of light received in the light-receiving unit in a case where a reference amount of visible light is reflected at the reflective member to enter the third region. The second image correction processing unit corrects an image obtained by irradiating a paper sheet with the visible light, based on the amount of visible light received in the third region of the light-receiving unit, and the visible light reference data stored in the visible light reference data storage unit.

In accordance with this configuration, visible light is reflected at the reflective member, and received by the third region of the light-receiving unit, thereby making it possible to correct, in a favorable manner, the image obtained by irradiating a paper sheet with the visible light, based on the amount of light received and the visible light reference data.

The linear light source may also include an infrared light source. In this case, the optical linear sensor unit may further include an infrared light reference data storage unit and a third image correction processing unit. The infrared light reference data storage unit stores, as infrared light reference data, an amount of light received in the light-receiving unit in a case where a reference amount of infrared light is reflected at the reflective member to enter the third region. The third image correction processing unit corrects an image obtained by irradiating a paper sheet with the infrared light, based on an amount of infrared light received in the third region of the light-receiving unit, and the infrared light reference data stored in the infrared light reference data storage unit.

In accordance with this configuration, infrared light is reflected at the reflective member, and received by the third region of the light-receiving unit, thereby making it possible to correct, in a favorable manner, the image obtained by irradiating a paper sheet with the infrared light, based on the amount of light received and the infrared light reference data.

Effects of the Invention

According to the present invention, in the case of ultraviolet light irradiation from the ultraviolet light source, the ultraviolet light reflected at the reflective member enters the first region of the light-receiving surface of the light-receiving unit, thus allowing the amount of ultraviolet light in the ultraviolet light source to be measured without using any fluorescent member, based on the amount of ultraviolet light received in the first region.

Furthermore, according to the present invention, in the case of ultraviolet light irradiation from the ultraviolet light source, the ultraviolet light reflected at the reflective member enters the first region of the light-receiving surface of the light-receiving unit without passing through the color filter, thus allowing the color filter to be prevented from being deteriorated by ultraviolet light.

MODE FOR CARRYING OUT THE INVENTION

<Optical linear Sensor Unit>

Figure 1:
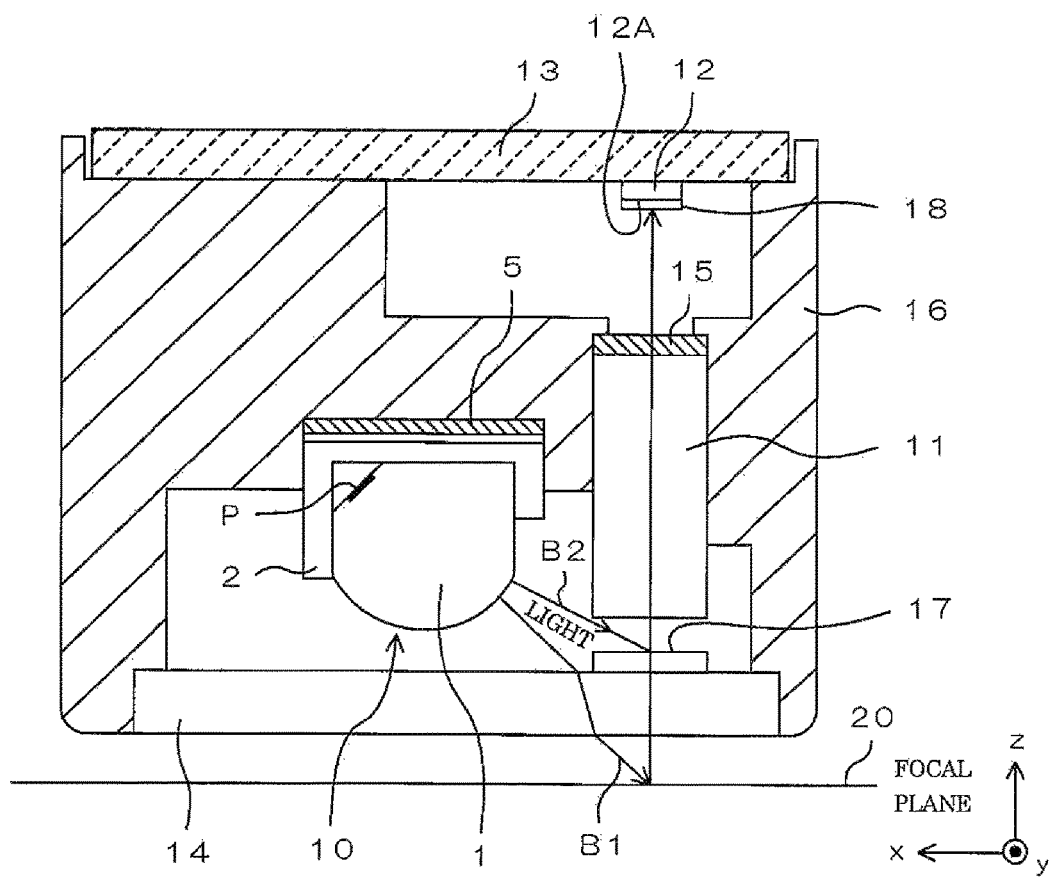
FIG. 1 is a schematic sectional view illustrating the configuration of an optical linear sensor unit according to an embodiment of the present invention.

FIG. 1 is a schematic sectional view illustrating the configuration of an optical linear sensor unit according to an embodiment of the present invention.

The optical linear sensor unit includes a linear light source 10, a lens array 11, and a light-receiving unit 12 in a housing 16. The linear light source 10 is used as an illumination light source for illuminating a paper sheet on a focal plane 20. The linear light source 10 has an ultraviolet light source and a visible light source (neither shown). The paper sheet illuminated with ultraviolet light from the ultraviolet light source produces fluorescence from the phosphor contained in the paper sheet. On the other hand, the paper sheet illuminated with visible light from the visible light source generates reflected light through the reflection of visible light on the surface of the paper sheet. Further, the linear light source 10 may include an infrared light source that emits infrared light.

The light from the illuminated paper sheet is guided to the light-receiving unit 12 by the lens array 11. The lens array 11 is an optical element that forms an image of light from the paper sheet on the light-receiving unit 12, and a rod lens array such as a SELFOC lens array (registered trademark: manufactured by Nippon Sheet Glass Co., Ltd.) can be used. In the present embodiment, the magnification of the lens array 11 is set to 1 (erecting). The lens array 11 has an aperture angle that transmits only light incident within a predetermined angle range. More specifically, light incident at an angle that is larger than the predetermined angle range is not capable of passing through the lens array 11, so as not to enter the light-receiving unit 12. The predetermined angle range is, for example, 10° to 20°, but not to be considered limited to this range.

The light-receiving unit 12 is mounted on a substrate 13 fixed to the housing 16. The light passing through the lens array 11 is received by a light-receiving surface 12A of the light-receiving unit 12, and a signal corresponding to the amount of light received is output from the light-receiving unit 12. For determining the authenticity of paper sheets such as bills and securities, the paper sheets are conveyed in one direction x along the focal plane 20, and light from the paper sheets is then continuously received by the light-receiving unit 12, thereby providing images of the paper sheets (such as a color image or a fluorescence image), based on output signals from the light-receiving unit 12.

The housing 16, the linear light source 10, the lens array 11, and the light-receiving unit 12 extend in the y direction perpendicular to the x direction. In the present embodiment, the x direction and the y direction are orthogonal to each other in a horizontal plane. Light (visible light, ultraviolet light, or infrared light) emitted from the linear light source 10 is used in a linear shape to irradiate the focal plane 20 in the y direction. In FIG. 1, the light from the linear light source 10 for irradiating the focal plane 20 is denoted by B1.

At least the ultraviolet light of the visible light, the ultraviolet light, and the infrared light is emitted so as not to temporally overlap with the other light (that is, while being temporally switched). The infrared light may be emitted while temporally overlapping with the visible light, or may be emitted so as not to temporally overlap with the visible light.

The light B1 emitted from the linear light source 10 passes through a protective glass 14 fixed to the housing 16, and is then collected on the focal plane 20. The protective glass 14 is provided to protect the linear light source 10 and the lens array 11 from dust scattering or damage during use. This protective glass 14 is also used for attaching a reflective member 17. The reflective member 17 is composed of a reflective plate that reflects (for example, diffusely reflects) light from the linear light source 10 and then guides the reflected light to the light-receiving unit 12.

The material of the protective glass 14 has only to transmit the light emitted from the linear light source 10, and may be a transparent resin such as an acrylic resin or a cycloolefin resin. In the present embodiment, it is preferable to use, as the material of the protective glass 14, a material that transmits, in particular, ultraviolet light, such as white plate glass or borosilicate glass.

A substrate 5 for fixing a light source unit (such as an ultraviolet light source or a visible light source) provided in the linear light source 10 is provided at a position opposed to the bottom surface of the linear light source 10 in the housing 16. This substrate 5, which is a thin insulating plate formed from phenol, glass epoxy, or the like, has a wiring pattern formed from copper foil formed on the back surface. Inserting the terminals of the light source unit into holes formed in various parts of the substrate 5 and joining the wiring pattern with a solder or the like on the back surface of the substrate allow the light source unit to be mounted and fixed on the substrate 5, and allow power to be supplied from a predetermined driving power supply (not shown) to the light source unit through the wiring pattern on the back surface of the substrate.

An ultraviolet light blocking filter (UV cut filter) 15 that blocks ultraviolet light from entering the light-receiving unit 12 is provided at an arbitrary position from the focal plane 20 to the light-receiving unit 12. The ultraviolet light blocking filter 15 blocks ultraviolet light by reflecting or absorbing the ultraviolet light. In the present embodiment, the ultraviolet light blocking filter 15 is attached to the surface on the light-receiving unit 12 side of the lens array 11, but the ultraviolet light blocking filter 15 may be provided on the surface on the focal plane 20 side of the lens array 11 and other positions. It is to be noted that "to block light" means that light is reflected or absorbed, but not transmitted.

The material and structure of the ultraviolet light blocking filter 15 are not to be considered particularly limited, as long as ultraviolet light can be prevented from entering the light-receiving unit 12. For example, an ultraviolet light absorbing film of a transparent film mixed therein or coated with an organic ultraviolet light absorbing agent, or an interference wave filter (band-pass filter) obtained by multi-layer deposition, on a glass surface, of metal oxide or dielectric thin films that are different in transmittance or refractive index, such as titanium oxide and silicon oxide, may be used as the ultraviolet light blocking filter 15.

The light-receiving unit 12 includes a light-receiving element that receives light and outputs electric signals by photoelectric conversion. The material and structure of the light-receiving element are not to be considered particularly limited, and may have a photodiode or a phototransistor disposed with the use of amorphous silicon, crystalline silicon, CdS, CdSe, or the like. Further, the light-receiving unit 12 may be composed of a CCD (Charge Coupled Device) linear image sensor. Furthermore, a so-called multi-chip type linear image sensor that has a plurality of ICs (Integrated Circuits) arranged, each integrated with a photodiode, a phototransistor, a driving circuit, and an amplifier circuit, may be used as the light-receiving unit 12. In addition, if necessary, an electric circuit such as a driving circuit and an amplifier circuit, a connector for signal extraction to the outside, or the like may be mounted on the substrate 13. Furthermore, a microcomputer, a storage element, an A/D converter, various correction circuits, an image processing circuit, a line memory, an I/O control circuit, and the like can be also mounted on the substrate 13 to extract digital signals to the outside.

A color filter 18 through which visible light in a specific wavelength range is allowed to pass is provided between the light-receiving unit 12 and the ultraviolet light blocking filter 15. Only visible light passing through the color filter 18 enters a region of the light-receiving surface 12A of the light-receiving unit 12, opposed to the color filter 18. Since the color filter 18 is provided closer to the light-receiving unit 12 than the ultraviolet light blocking filter 15, no ultraviolet light enters the color filter 18, as long as the color filter 18 is located on the optical path of light transmitted through the ultraviolet light blocking filter 15.

The color filter 18 covers each light-receiving element of the light-receiving unit 12. The light-receiving unit 12 has a plurality of, for example, four light-receiving elements linearly arranged per pixel (the pixel refers to a spatial unit for reading and processing image data). Three of the four light-receiving elements are respectively covered with red (R), green (G), and blue (B) color filters 18, and the other one is covered with a transparent filter (W), or not covered with any filter. It is to be noted that the color filter 18 transmits no ultraviolet light, and has transparency to infrared light. As described above, the light-receiving unit 12 is provided with the color filters 18 corresponding to the respective pixels, and the light transmitted through the color filters 18 enters the respective light-receiving elements. The color filters 18 are, however, not limited to three colors for each pixel.

The red (R) color filter 18 transmits light in a wavelength range around red. The green (G) color filter 18 transmits light in a wavelength range around green. The blue (B) color filter 18 transmits light in a wavelength range around blue. The light transmitted through the color filters 18 of the respective colors is received by the respective light-receiving elements of the light-receiving unit 12, thereby allowing color information of the paper sheet to be determined, based on the signal intensity at each light-receiving element. In addition, the total amount of light incident on each pixel can be calculated, based on the signal intensity of the light transmitted through the transparent (W) filter or light that is not transmitted through the filter. This makes it possible to obtain image data based on the accurate amount of light for each color signal, with the total amount of light as a denominator (reference).

Figure 2:
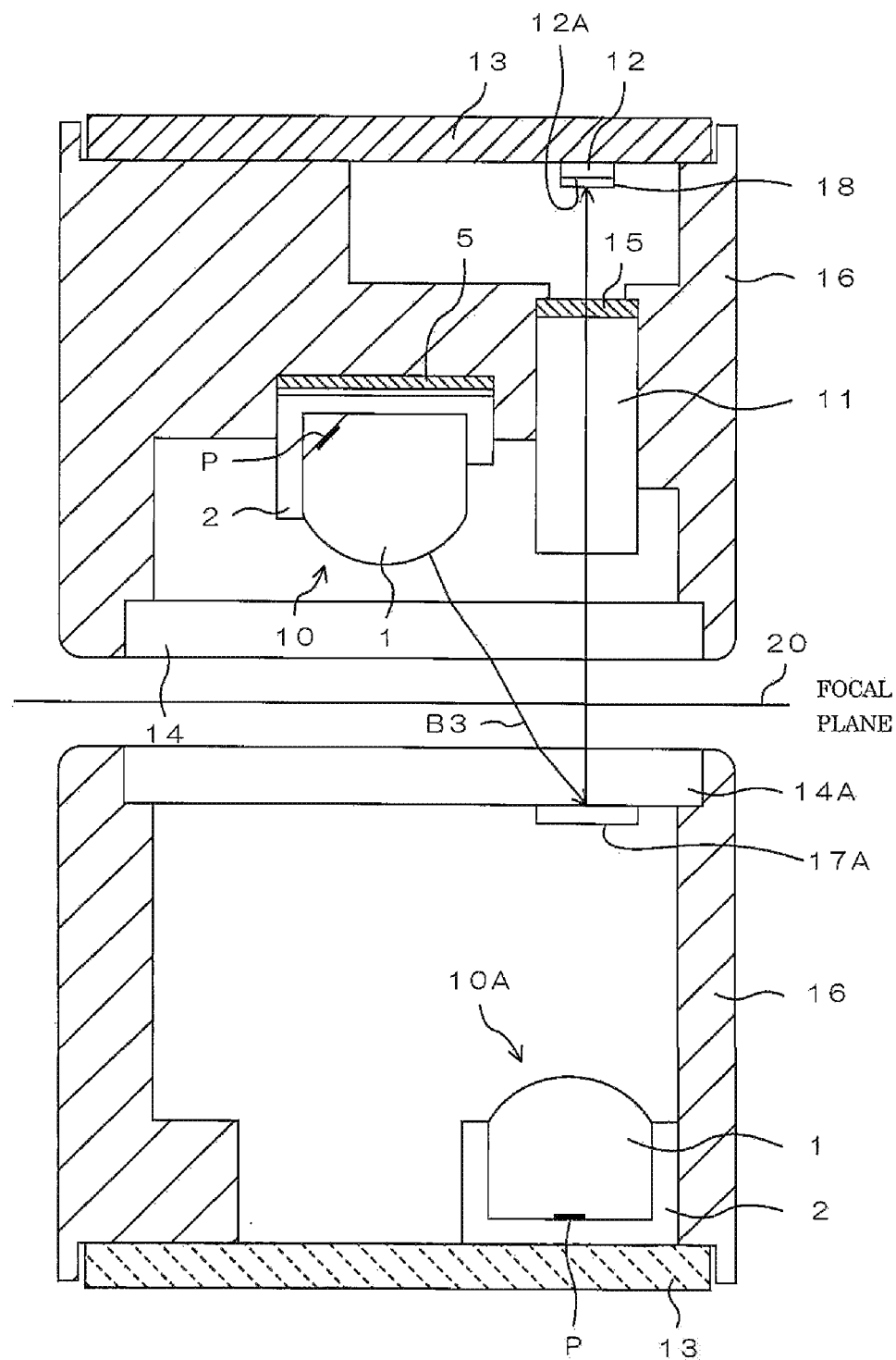
FIG. 2 is a schematic sectional view illustrating an additional configuration of the optical linear sensor unit.

It is to be noted that such a configuration for light irradiation from one linear light source 10 toward a paper sheet has been described for the above-described optical linear sensor unit, the optical linear sensor unit is not limited to this configuration, and may have a configuration provided with a plurality of linear light sources 10. For example, a linear light source that emits ultraviolet light and a linear light source that emits visible light (and infrared light) may be provided separately. In this case, the two linear light sources 10 may be arranged close to the light-receiving unit 12 with respect to the focal plane 20 as a reference, or as shown in FIG. 2, one linear light source 10A may be arranged on the side opposite to the light-receiving unit 12. In the case of a configuration in which a transmission-type unit as shown in FIG. 2 is added, the configuration differs from the arrangement of FIG. 1 only in that a linear light source 10A is located below the focal plane 20, and the other members such as the lens array 11 and the light-receiving unit 12 are configured similarly to the above-described configuration.

<Reflective Member>

Figure 3A:
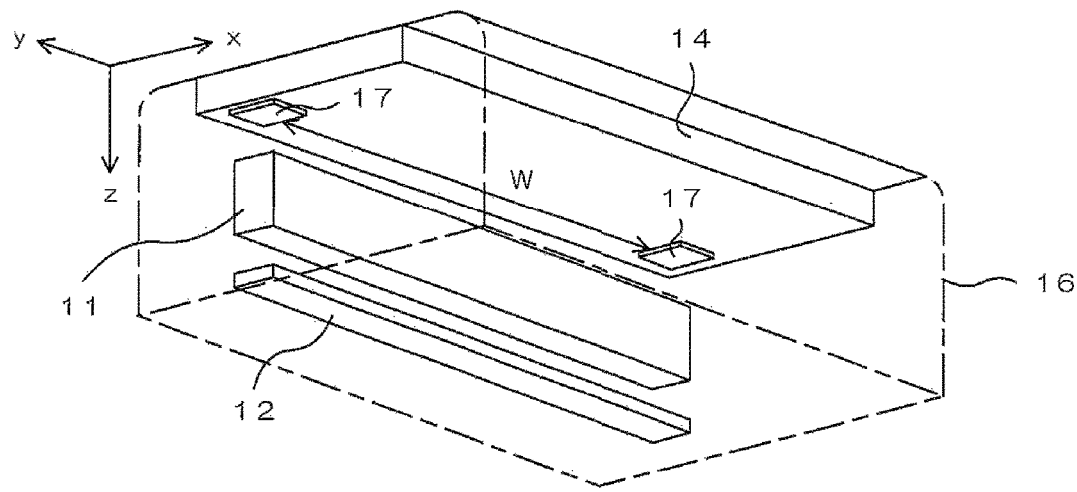
FIG. 3A is a perspective view of the optical linear sensor unit for showing the mounting position of a reflective member, which shows a view as viewed obliquely from below.
Figure 3B:
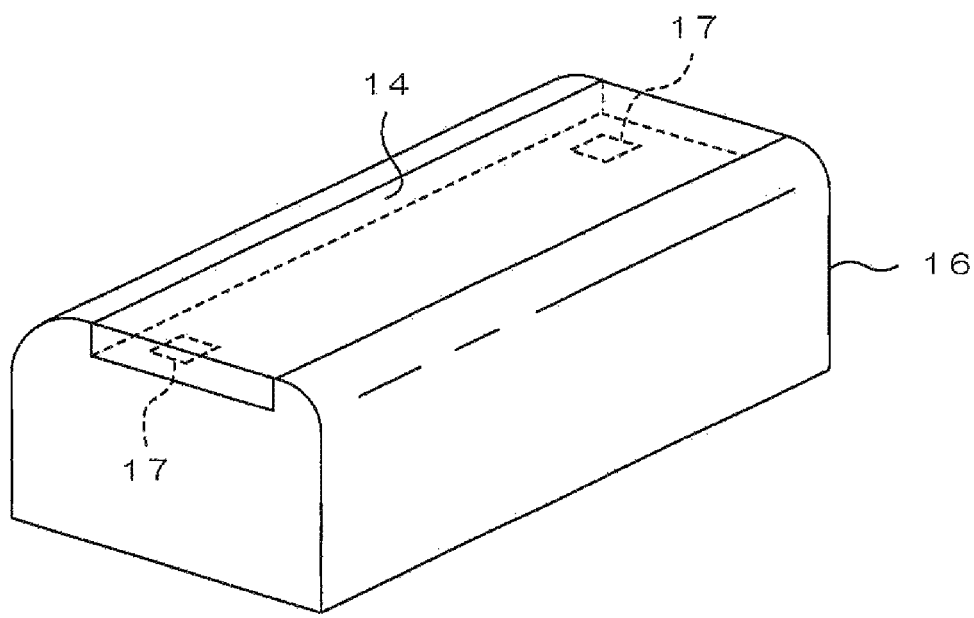
FIG. 3B is a perspective view of the optical linear sensor unit for showing the mounting position of a reflective member, which shows a view as viewed obliquely from above.

FIGS. 3A and 3B are perspective views of the optical linear sensor unit for showing the mounting position of the reflective member 17. FIG. 3A is a perspective view of the optical linear sensor unit viewed obliquely from below, and illustrates the lens array 11, the light-receiving unit 12, and the protective glass 14 through the housing 16. FIG. 3B is a perspective view of the optical linear sensor unit viewed obliquely from above. It is to be noted that the ultraviolet light blocking filter 15 and the color filter 18 are omitted in FIGS. 3A and 3B.

The light-receiving unit 12 is capable of reading an image of a paper sheet in the image region W shown in FIG. 3A. The image region W is a region that is linear in the y direction, and the paper sheet is conveyed into a region on the focal plane 20 opposed to the image region W, thereby allowing light from the paper sheet to pass through the image region W, the light is then received by the light-receiving unit 12, and the image of the paper sheet is read. The reflective member 17 is provided within the reading region of the light-receiving unit 12 (refers to a region that is linear in the y direction, in which the light-receiving element is capable of receiving light) and outside the image region W.

For example, as shown in FIG. 3A, reflective members 17 are provided respectively at positions immediately above both ends of the lens array 11 outside the image region W in the y direction. Since the lens array 11 is an erecting lens as described above, the both ends of the lens array 11 optically correspond to both ends of the reading region of the light-receiving unit 12. The reflective members 17 are, however, not limited to the configuration of the members provided respectively outside the both ends of the image region W in the y direction, and may be, as a configuration, provided only outside one of the ends.

The reflective member 17 is disposed on the optical path from the linear light source 10 to the lens array 11. As in the present embodiment, the reflective member 17 is preferably disposed on the inner surface of the protective glass 14, but not to be considered limited to thereto. The reflective member 17 can be also disposed on the outer surface of the protective glass 14, but in this case, there is a possibility that the reflective member 17 may come into contact with conveyed paper sheets, and it is thus necessary to take measures such as embedding the reflective member 17 in the protective glass 14. In FIG. 1, the light from the linear light source 10 for irradiating the reflective member 17 is denoted by B2.

In addition, in a case where a transmission-type unit as shown in FIG. 2 is added, the reflective member 17 may be disposed on the inner surface of a protective glass 14A of the transmission-type unit. In FIG. 2, the light from the linear light source 10 for irradiating the reflective member 17 is denoted by B3.

The method for attaching the reflective member 17 to the protective glass 14 is not limited, but for example, an object in the form of a tape may be attached, printing may be performed on the surface of the protective glass 14, or an object in the form of a paste may be applied. The shape of the reflective member 17 is also not limited. The shape may be a quadrangular shape as shown, or any other shape.

<Illuminance Correction System>

Figure 4:
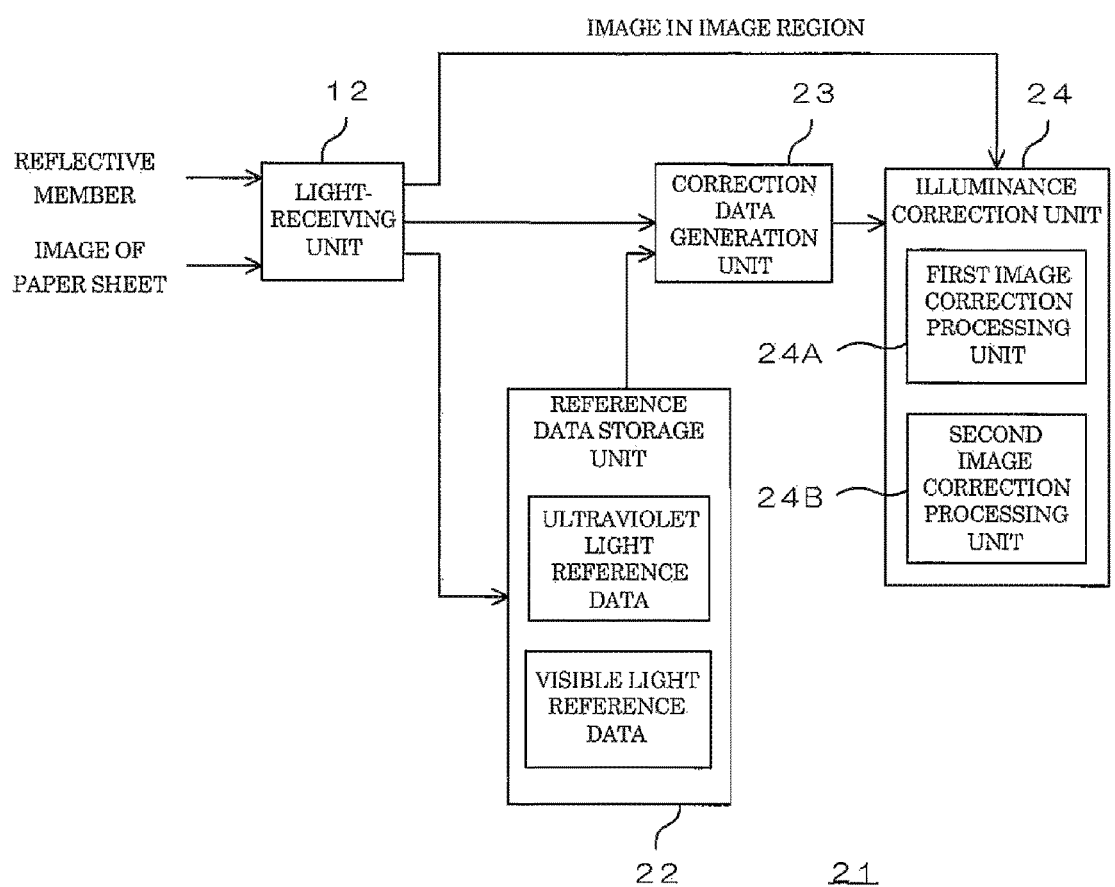
FIG. 4 is a block diagram illustrating an illuminance correction system that receives light from the reflective member in the light-receiving unit, calculates correction data, and corrects an image of a paper sheet.

FIG. 4 is a block diagram illustrating an illuminance correction system 21 that receives light from the reflective member 17 in the light-receiving unit 12, calculates correction data, and corrects an image of a paper sheet in the case of using visible light and ultraviolet light.

The illuminance correction system 21 is composed of a microcomputer and peripheral storage elements therefor, software for driving the microcomputer, and the like. The illuminance correction system 21 is capable of correcting the obtained color image in the case of irradiating the paper sheet with visible light, and capable of correcting the obtained fluorescence image in the case of irradiating the paper sheet with ultraviolet light.

The reference data storage unit 22 stores therein ultraviolet light reference data and visible light reference data. The ultraviolet light reference data represents the amount of light received S0 in the light-receiving unit 12, of the ultraviolet light reflected by the reflective member 17, in a case where the ultraviolet light emitted from the ultraviolet light source has an appropriate amount of light (reference amount of light). The visible light reference data represents the amount of light received S'0 in the light-receiving unit 12, of the visible light reflected by the reflective member 17, in a case where the amount of visible light emitted from the visible light source has an appropriate amount of light (reference amount of light). The reference data storage unit 22 constitutes an ultraviolet light reference data storage unit that stores ultraviolet light reference data, and a visible light reference data storage unit that stores visible light reference data.

The correction data generation unit 23 actually reflects each of ultraviolet light and visible light at the reflective member 17, and receives the reflected light in real time at the light-receiving element at the end of the light-receiving unit 12, thereby generating correction data based on the amounts of light received S1, S'1. The reciprocal (S0/S1) of the ratio between the amount of light received S1 of the ultraviolet light and the amount of light received S0 represented by the ultraviolet light reference data in this case may be generated as correction data (ultraviolet light correction data) for correcting the illuminance of the fluorescence image of the paper sheet, and the reciprocal (S'0/S'1) of the ratio between the amount of light received S'1 of the visible light and the amount of light received S'0 represented by the visible light reference data may be generated as correction data (visible light correction data) for correcting the illuminance of the visible light image of the paper sheet.

The illuminance correction unit 24 corrects the image of the paper sheet with the use of the correction data. Specifically, the correction data is multiplied by the illuminance value of the image data of the paper sheet in the image region W, received by the light-receiving element at the center of the light-receiving unit 12. The illuminance correction unit 24 includes a first image correction processing unit 24A that corrects a fluorescence image, and a second image correction processing unit 24B that corrects a visible light image.

The first image correction processing unit 24A multiplies the illuminance value of the fluorescence image obtained by irradiating the paper sheet with the ultraviolet light, by the ultraviolet light correction data (S0/S1), thereby performing the correction. On the other hand, the second image correction processing unit 24B multiplies the illuminance value of the visible light image obtained by irradiating the paper sheet with the visible light, by the visible light correction data (S'0/S'1), thereby performing the correction. The corrections make it possible to absorb the fluctuation in the amount of light from the linear light source 10, thereby keeping the illuminances of the fluorescence image and visible light image of the paper sheet consistently constant.

As described above, the first image correction processing unit 24A corrects the image (fluorescence image) obtained by irradiating the paper sheet with the ultraviolet light, based on the amount of light received in the light-receiving unit 12, of the ultraviolet light reflected at the reflective member 17, and on the ultraviolet light reference data stored in the reference data storage unit 22. On the other hand, the second image correction processing unit 24B corrects the image (visible light image) obtained by irradiating the paper sheet with the visible light, based on the amount of light received in the light-receiving unit 12, of the visible light reflected at the reflective member 17, and on the visible light reference data stored in the reference data storage unit 22.

The processing of the correction data generation unit 23 for generating the correction data may be performed in parallel with the processing for reading the fluorescence image or visible light image of the paper sheet, or may be performed in another mode (correction mode) before the processing for reading the fluorescence image or visible light image of the paper sheet.

<Positional Relation between Reflective Member and Each Filter>

Figure 5:
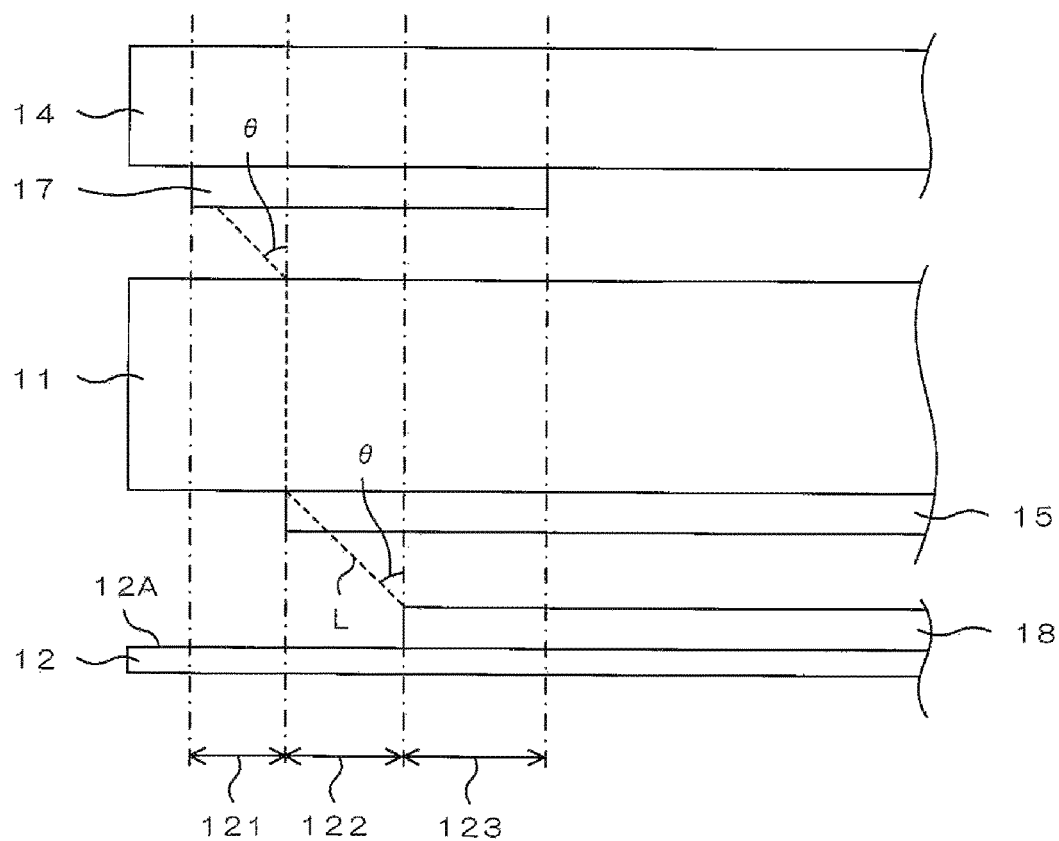
FIG. 5 is a cross-sectional view illustrating the configuration of an end of the optical linear sensor unit.

FIG. 5 is a cross-sectional view illustrating the configuration of an end of the optical linear sensor unit. FIG. 5 shows only the configuration of one end of the optical linear sensor unit, but the other end also has the same configuration. More specifically, the reflective members 17 are provided at both ends of the optical linear sensor unit, and each reflective member 17 is opposed to both ends for each of the ultraviolet light blocking filter 15 and the color filter 18. However, as a configuration, the reflective member 17 may be provided only at one end of the optical linear sensor unit.

As shown in FIG. 5, the light-receiving surface 12A of the light-receiving unit 12 is divided into a first region 121, a second region 122, and a third region 123 in the region opposed to the reflective member 17. In the first region 121, the light-receiving surface 12A of the light-receiving unit 12 is not opposed to the ultraviolet light blocking filter 15 and the color filter 18, but is opposed to the reflective member 17 without the filters 15, 18 interposed therebetween. More specifically, as viewed in the vertical direction (z direction), the first region 121 is overlapped with only the reflective member 17, and the ultraviolet light blocking filter 15 and the color filter 18 are disposed so as not to overlap the first region 121.

In the second region 122, the light-receiving surface 12A of the light-receiving unit 12 is not opposed to the color filter 18, but is opposed to the ultraviolet light blocking filter 15 and the reflective member 17 without the color filter 18 interposed therebetween. More specifically, as viewed in the vertical direction (z direction), the second region 122 is overlapped with the reflective member 17 and the ultraviolet light blocking filter 15, and the color filter 18 is only disposed so as not to overlap the second region 122.

In the third region 123, the light-receiving surface 12A of the light-receiving unit 12 is opposed to the ultraviolet light blocking filter 15, the color filter 18, and the reflective member 17. More specifically, as viewed in the vertical direction (z direction), the reflective member 17, the ultraviolet light blocking filter 15, and the color filter 18 are all disposed so as to overlap with each other in the third region 123.

As described above, according to the present embodiment, the respective ends of the ultraviolet light blocking filter 15 and the color filter 18 are provided at positions shifted from each other in a direction (y direction) parallel to the light-receiving surface 12A, thereby forming the second region 122 between the respective ends. Specifically, in a case where the center side of the light-receiving surface 12A is regarded as inside, whereas the side opposite to the center side is regarded as outside, the outer end of the ultraviolet light blocking filter 15 is located inside the outer end of the reflective member 17, and the outer end of the color filter 18 is located inside the outer end of the ultraviolet light blocking filter 15.

The above-described ultraviolet light reference data refers to the amount of light received in the light-receiving unit 12 in a case where a reference amount of ultraviolet light is reflected at the reflective member 17 to enter the first region 121, that is, the amount of light received in the light-receiving unit 12 in the case of entering the first region 121 without passing through the ultraviolet light blocking filter 15 and the color filter 18. The first image correction processing unit 24A corrects the fluorescence image of the paper sheet, based on the actual amount of ultraviolet light received in the first region 121 of the light-receiving unit 12 and the ultraviolet light reference data.

In addition, the above-described visible light reference data refers to the amount of light received in the light-receiving unit 12 in a case where a reference amount of visible light is reflected at the reflective member 17 to enter the third region 123, that is, the amount of light received in the light-receiving unit 12 in the case of entering the third region 123 through the ultraviolet light blocking filter 15 and the color filter 18. The second image correction processing unit 24B corrects the visible light image of the paper sheet, based on the actual amount of visible light received in the third region 123 of the light-receiving unit 12 and the visible light reference data.

The light diffusely reflected at the reflective member 17 partially travels toward the light-receiving unit 12 along such an optical path indicated by a dashed line in FIG. 5, for example. In this case, the incidence angle of light from the reflective member 17 to the lens array 11 is coincident with the outgoing angle of light from the lens array 11 toward the light-receiving unit 12. In the present embodiment, the angle θ made by the straight line L connecting the respective ends (outer ends) of the ultraviolet light blocking filter 15 and the color filter 18 and a direction (vertical direction) orthogonal to the light-receiving surface 12A is equal to or larger than the above-described predetermined angle range (for example, 10° to 20°). More specifically, the angle θ has a value equal to or larger than the aperture angle of the lens array 11.

It is to be noted that the illuminance correction unit 24 may include a third image correction processing unit (not shown) that corrects an infrared light image. In addition, in the reference data storage unit 22, the amount of light received in the light-receiving unit 12 in a case where a reference amount of infrared light is reflected at the reflective member 17 to enter the third region 123 may be stored as infrared light reference data. In this case, the third image correction processing unit corrects the image obtained by irradiating the paper sheet with infrared light, based on the amount of infrared light received in the third region 123 of the light-receiving unit 12 and the infrared light reference data stored in the reference data storage unit 22.

<Linear Light Source>

Figure 6:
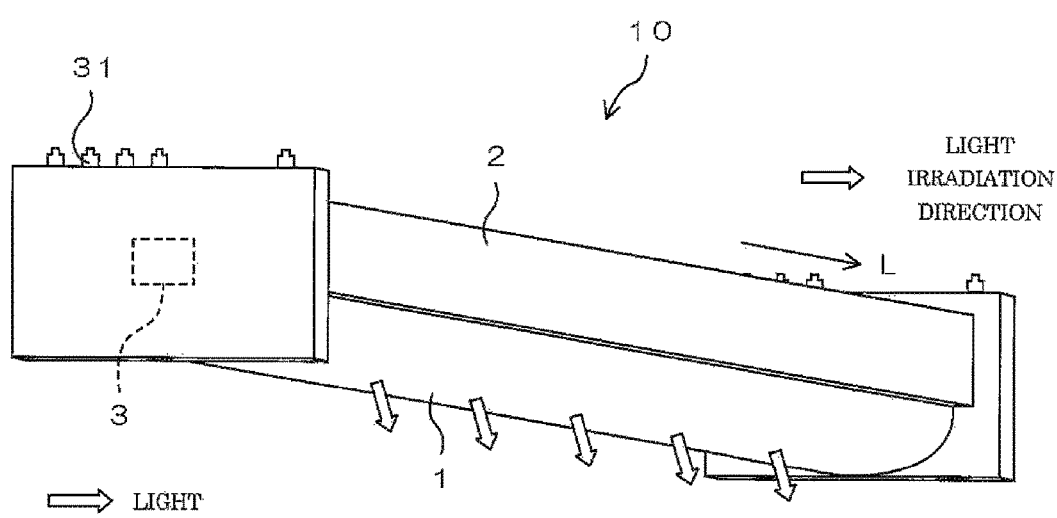
FIG. 6 is a perspective view schematically illustrating the appearance of the linear light source in the optical linear sensor unit shown in FIG. 1.
Figure 7:
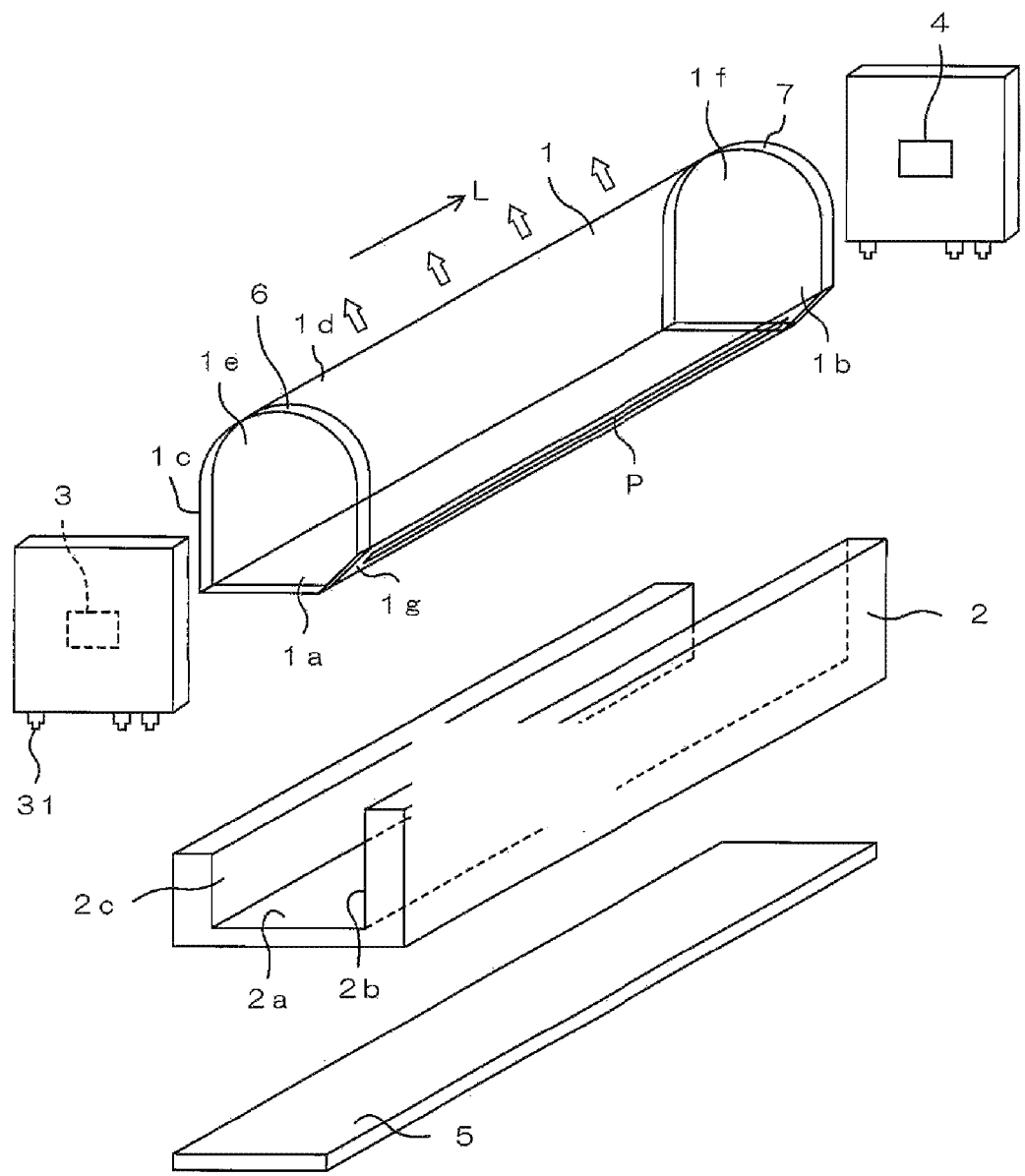
FIG. 7 is an exploded perspective view of respective constituent members of the linear light source.
Figure 8:
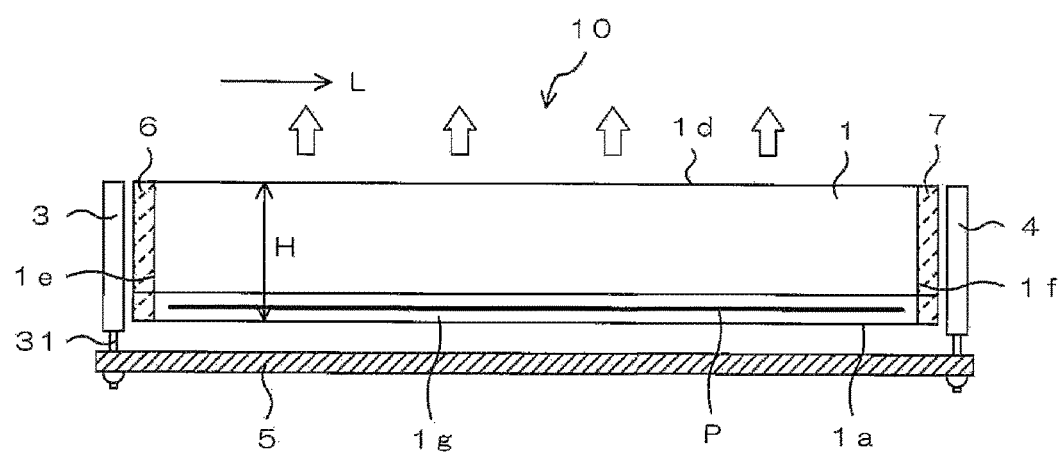
FIG. 8 is a side view of the linear light source.

FIG. 6 is a perspective view schematically illustrating the appearance of the linear light source 10 in the optical linear sensor unit shown in FIG. 1. FIG. 7 is an exploded perspective view of respective constituent members of the linear light source 10, and FIG. 8 is a side view of the linear light source 10. It is to be noted that the illustration of a cover member 2 is omitted in FIG. 8.

The linear light source 10 has a transparent light guide 1 extending in the longitudinal direction L, a second light source unit 3 provided near one end surface in the longitudinal direction L, a first light source unit 4 provided near the other end surface in the longitudinal direction L, a cover member 2 for holding respective side surfaces (a bottom side surface 1a and left/right side surfaces 1b and 1c) of the light guide 1, and a light diffusion pattern P formed on a light diffusion pattern forming surface 1g formed obliquely between the bottom side surface 1a and the left/right side surface 1b, for diffusing and refracting light made incident on end surfaces 1e and 1f of the light guide 1 from the second light source unit 3 and the first light source unit 4 to travel through the light guide 1, and then making the light outgoing from the light-emitting side surface 1d of the light guide 1. Preferably, the linear light source 10 further has a second filter 6 and a first filter 7 formed respectively on the end surfaces 1e and 1f of the light guide 1.

The light guide 1 may be formed from a resin which is high in light transmittance, such as an acrylic resin, or from optical glass, but in the present embodiment, a fluorine-based resin or a cycloolefin-based resin which is relatively less likely attenuate ultraviolet light is preferred as a material for the light guide 1, because of the use of the first light source unit 4 that emits ultraviolet light.

The light guide 1 has an elongated columnar shape, and the cross section thereof orthogonal to the longitudinal direction L has substantially the same shape and dimensions at any cut in the longitudinal direction L. In addition, the proportion of the light guide 1, that is, the ratio between the length of the light guide 1 in the longitudinal direction L and the height H of the cross section orthogonal to the longitudinal direction L is larger than 10, preferably larger than 30. For example, if the length of the light guide 1 is 200 mm, the height H of the cross section orthogonal to the longitudinal direction L is about 5 mm.

The side surface of the light guide 1 is composed of five side surfaces of the light diffusion pattern forming surface 1g (corresponding to an oblique cut surface of the light guide 1 in FIG. 7), the bottom side surface 1a, the left/right side surfaces 1b and 1c, and a light-emitting side surface 1d (corresponding to an upper surface of the light guide 1 in FIG. 7). The bottom side surface 1a and the left/right side surfaces 1b and 1c each have a planar shape, and the light-emitting side surface 1d is formed in an outwardly smoothly curved shape in order to provide the lens with a light collection effect. There is, however, no need to form the light-emitting side surface 1d in the curved shape, and the light-emitting side surface 1d may have a planar shape. In this case, a lens that collects the light emitted from the light guide 1 may be disposed so as to be opposed to the light-emitting side surface having a planar shape.

The light diffusion pattern P on the light diffusion pattern forming surface 1g extends in a straight line in the longitudinal direction L of the light guide 1, with a constant width kept. The dimension of the light diffusion pattern P in the longitudinal direction L is formed to be longer than the reading length of the optical linear sensor (that is, the width of the reading region of the light-receiving unit 12).

The light diffusion pattern P is composed of a plurality of V-shaped grooves obtained by engraving the light diffusion pattern forming surface 1g of the light guide 1. Each of the plurality of V-shaped grooves is formed to extend in a direction orthogonal to the longitudinal direction L of the light guide 1, and the grooves are equal in length to each other. The cross sections of the plurality of V-shaped grooves may have, for example, an isosceles triangular shape.

This light diffusion pattern P allows light made incident from the end surfaces 1e and 1f of the light guide 1 and propagated in the longitudinal direction L inside the light guide 1 to be refracted and diffused, and emitted from the light-emitting side surface 1d, with substantially uniform brightness in the longitudinal direction L. This allows the light with which the paper sheet is irradiated to be entirely made substantially constant in the longitudinal direction L of the light guide 1, thereby eliminating uneven illuminance.

It is to be noted that the V-shaped groove of the light diffusion pattern P by way of example may be arbitrarily changed, such as a U-shaped groove instead of the V-shaped groove, as long as the uneven illuminance is not significant. There is also no need to keep the width of the light diffusion pattern P a constant width, and the width may vary in the longitudinal direction L of the light guide 1. The depth of the groove and the opening width of the groove can also be changed appropriately.

The cover member 2 has a shape elongated in the longitudinal direction L of the light guide 1, and so as to make it possible cover the bottom side surface 1a and left/right side surfaces 1b and 1c of the light guide 1, has a bottom surface 2a opposed to the light diffusion pattern forming surface 1g of the light guide 1, a right side surface 2b opposed to the right side surface 1b of the light guide 1, and a left side surface 2c opposed to the left side surface of the light guide 1. The three side surfaces each has a planar shape, and the three inner surfaces form a recess that has substantially U-shaped cross section, and the light guide 1 can be thus inserted into the recess. In this covered state, the bottom surface 2a of the cover member 2 has close contact with the bottom side surface 1a of the light guide 1, and the right side surface 2b of the cover member 2 has close contact with the right side surface 1b of the light guide 1, whereas the left side surface 2c thereof has close contact with the left side surface 1c of the light guide 1. Thus, the light guide 1 can be protected by the cover member 2.

It is to be noted that the cover member 2 is not limited to a transparent cover, and may be translucent or opaque. For example, the cover member 2 may be a molded article of a white resin which is high in reflectance or a molded article of a resin coated with the white resin, in order to reflect light leaking from the side surfaces other than the light-emitting surface of the light guide 1 into the light guide 1 again. Alternatively, the cover member 2 may be formed from a metal body such as stainless steel or aluminum.

The second light source unit 3 is a light source that emits visible light, or light of wavelengths ranging from visible light to infrared light, for which, for example, multiple LEDs (Light Emitting Diodes) that emit light of each wavelength of near infrared, red, green, and blue are used. In the case of emitting white light of red, green, and blue mixed, the three colors of red, green, and blue may be simultaneously turned on, or a fluorescent agent may be mixed in with a sealant for an LED light source to emit white light with fluorescence. The first light source unit 4 is a light source that emits ultraviolet light to the light guide 1, for which an ultraviolet LED light source or the like can be used. Preferably, an ultraviolet light-emitting diode with a peak wavelength in the range of 330 nm to 380 nm is used.

For the second light source unit 3 and the first light source unit 4, terminals 31 for mounting on the substrate 5 are formed, and the terminals 31 are inserted into the substrate 5 and joined by soldering or the like, and then each electrically connected to a driving power supply (not shown). The driving power supply has a circuit configuration capable of selecting an electrode terminal for the application of a voltage to the second light source unit 3 and an electrode terminal for the application of a voltage to the first light source unit 4, thereby simultaneously driving or temporally switching the second light source unit 3 and the first light source unit 4 to emit light. Further, any LED of the multiple LEDs built in the second light source unit 3 can be also selected, and then simultaneously driven or temporally switched to emit light.

The foregoing configuration, as a compact configuration, allows visible light or light in a wavelength range including visible light to infrared light to enter the light guide 1 from the end surface 1e with the second light source unit 3 provided, and allows ultraviolet light to enter the light guide 1 from the end surface 1f with the first light source unit 4 provided. Thus, the light emitted from the first light source unit 4 or the light emitted from the second light source unit 3 can be made outgoing from the light-emitting side surface 1d of the light guide 1.

Preferably, the end surface 1e of the light guide 1 with the second light source unit 3 provided is provided with the second filter 6 that transmits infrared light and visible light of 420 nm or longer, and reflects or absorbs and then block ultraviolet light of shorter than 400 nm. In addition, the end surface 1f of the light guide 1 with the first light source unit 4 provided is provided with the first filter 7 that transmits ultraviolet light of shorter than 400 nm, and reflects or absorbs and then blocks infrared light and visible light of 420 nm or longer.

The second filter 6 and the first filter 7 are not to be considered particularly limited, and may be composed of any material and structure as long as the filters block the target wavelength ranges. For example, as a filter for reflection, an interference wave filter (bandpass filter) is preferred, which is obtained by multi-layer deposition, on a glass surface, of metal oxide or dielectric thin films that are different in transmittance or refractive index. The interference wave filter for reflection is obtained by, for example, multi-layer deposition of a silicon oxide and a tantalum pentoxide adopted and each adjusted in transmittance or refractive index, and film thickness for ensuring desired band-pass filter characteristics. It is to be noted that there is no particular limitation on the adoption of the band-pass filter, as long as the filter is conventionally produced for ordinary optics-related industries, and adapted to meet the required performance.

In a case where interference wave filters are used for the second filter 6 and the first filter 7, if it is not possible to adjust the target transmission band only with the interference wave filters, the lamination of a film obtained with the use of a thin film of a metal, or an oxide, a nitride, or fluoride thereof makes it possible to ensure desired wavelength characteristics. As long as the second filter 6 is a filter that absorbs ultraviolet light, the second filter 6 may be an ultraviolet light absorbing film of a transparent film mixed in or coated with an organic ultraviolet light absorbing agent.

Furthermore, as long as the first filter 7 is a filter that absorbs visible light and infrared light, a substance that transmits ultraviolet light and cuts visible light and infrared light may be added to the film. It is to be noted that the method for providing the second filter 6 and the first filter 7 on the light guide 1 is arbitrary, and the end surfaces 1e and 1f of the light guide 1 may be covered by coating or vapor deposition. Alternatively, film-shaped or plate-shaped second filter 6 and first filter 7 may be prepared, and closely attached to the end surfaces 1e and 1f of the light guide 1 or attached at a certain distance from the end surfaces 1e and 1f.

<Operation Effects>

According to the present embodiment, in the case of ultraviolet light irradiation from the first light source unit 4, the ultraviolet light reflected at the reflective member 17 enters the first region 121 of the light-receiving surface 12A of the light-receiving unit 12, thus allowing the amount of ultraviolet light in the first light source unit 4 to be measured without using any fluorescent member, based on the amount of ultraviolet light received in the first region 121. Furthermore, in the case of visible light irradiation from the second light source unit 3, the visible light reflected at the reflective member 17 enters the third region 123 of the light-receiving surface 12A of the light-receiving unit 12 through the color filter 18, thus allowing the amount of visible light in the second light source unit 3 to be measured, based on the amount of visible light received in the third region 123.

In the case of ultraviolet light irradiation from the first light source unit 4, the ultraviolet light reflected at the reflective member 17 enters the first region 121 of the light-receiving surface 12A of the light-receiving unit 12 without passing through the color filter 18. Thus, the color filter 18 can be prevented from being deteriorated by ultraviolet light. In particular, between the first region 121 and the third region 123, the second region 122 opposed to the reflective member 17 and the ultraviolet light blocking filter 15 is provided without the color filter 18 interposed therebetween, thus making it possible to prevent ultraviolet light from reaching the color filter 18 opposed to the third region 123, and making it possible to ensure that the color filter 18 is prevented from being deteriorated by ultraviolet light.

Figure 9:
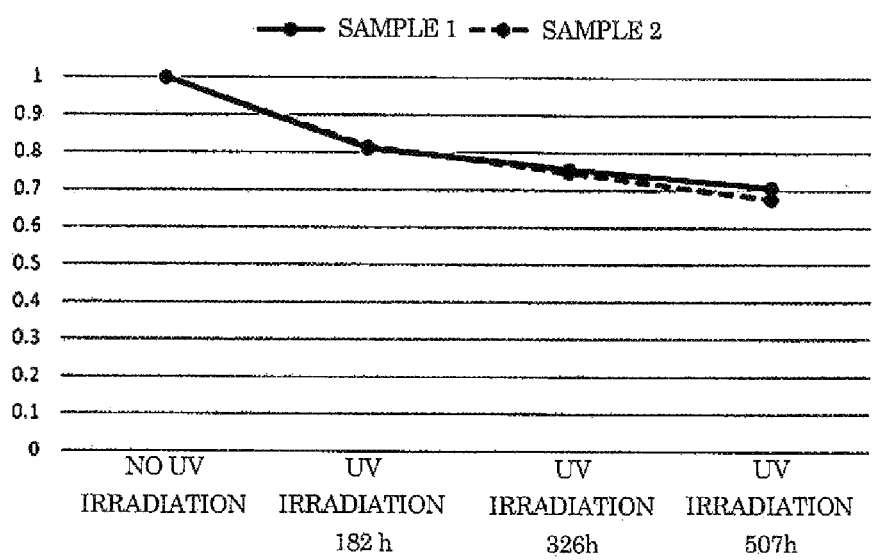
FIG. 9 is a diagram for explaining deterioration of a fluorescent member in the case of measuring the amount of ultraviolet light with the use of the fluorescent member.

FIG. 9 is a diagram for explaining deterioration of a fluorescent member in the case of measuring the amount of ultraviolet light with the use of the fluorescent member. FIG. 9 shows the relation between the irradiation time and the amount of fluorescence in the case of irradiating two samples with ultraviolet light. As shown in FIG. 9, it is determined that in the case of irradiating the fluorescent member with ultraviolet light in order to measure the amount of ultraviolet light, as the time of the irradiation with the ultraviolet light is longer, the fluorescent member is more deteriorated, and the amount of fluorescence is decreased. When the amount of fluorescence is decreased, an error will be caused in the amount of ultraviolet light measured, based on the amount of fluorescence, and the image of the paper sheet will be corrected, based on the amount of ultraviolet light in which the error is caused, thus also affecting the result of determining the authenticity of paper sheets. According to the present embodiment, the amount of ultraviolet light can be measured without using any fluorescent member, thus making it possible to prevent the deterioration of the fluorescent member from affecting the result of determining the authenticity of paper sheets.

Figure 10A:
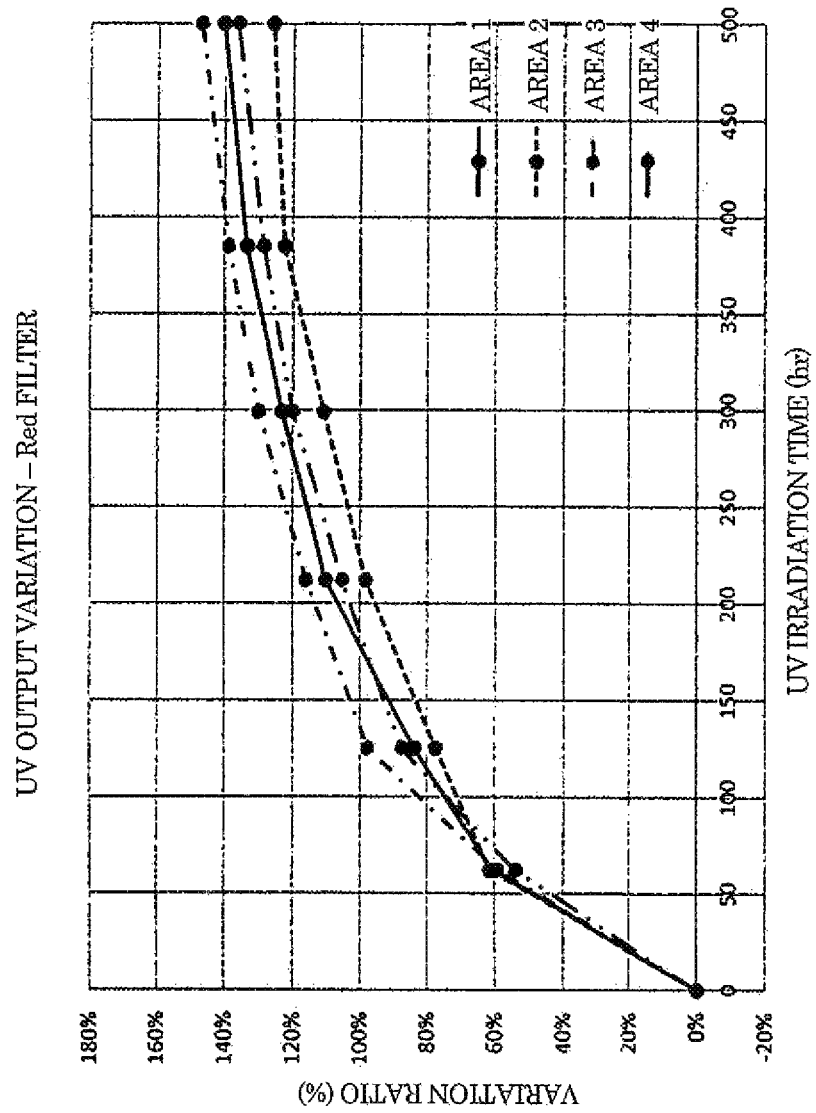
FIG. 10A is a diagram for explaining deterioration of a color filter due to ultraviolet light, which shows deterioration of a red (R) color filter.
Figure 10B:
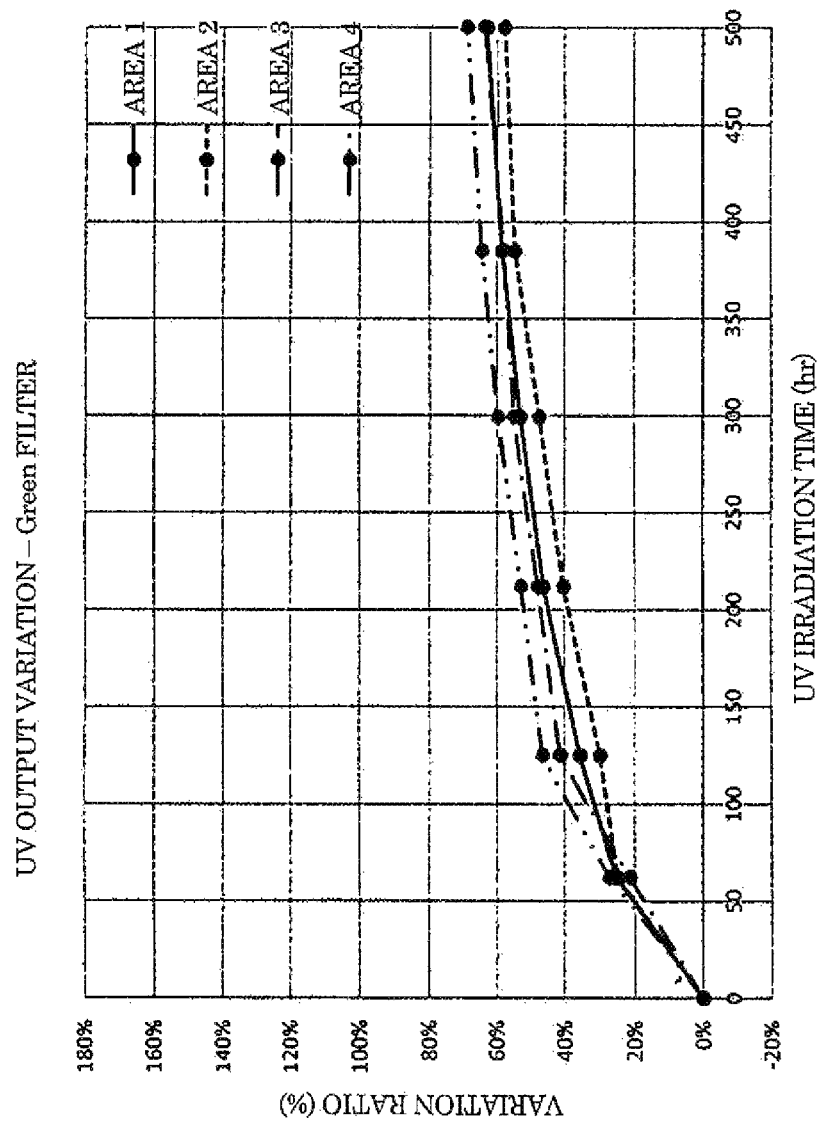
FIG. 10B is a diagram for explaining deterioration of a color filter due to ultraviolet light, which shows deterioration of a green (G) color filter.
Figure 10C:
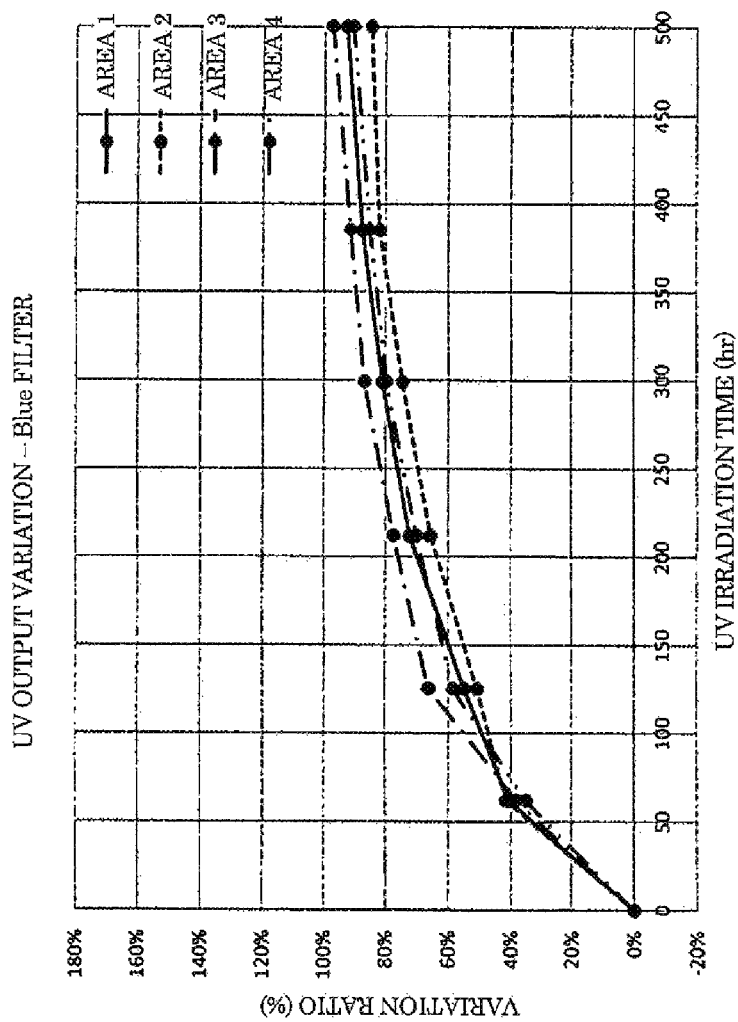
FIG. 10C is a diagram for explaining deterioration of a color filter due to ultraviolet light, which shows deterioration of a blue (B) color filter.

FIGS. 10A to 10C are diagrams for explaining deterioration of the color filter 18 due to ultraviolet light, where FIG. 10A shows deterioration of a red (R) color filter 18, FIG. 10B shows deterioration of a green (G) color filter 18, and FIG. 10C shows deterioration of a blue (B) color filter 18. FIGS. 10A to 10C each show the relation between the irradiation time and the ultraviolet light transmittance in the case of irradiating four areas of each color filter 18 with ultraviolet light. As shown in FIGS. 10A to 10C, it is determined that all of the color filters 18 are more denatured as the time of the irradiation with ultraviolet light is longer, and the ultraviolet light transmittance is changed. In particular, the red (R) color filter 18 changes greatly in ultraviolet light transmittance, and the variation in the amount of ultraviolet light transmitted through the color filter 18 together with the fluorescence will degrade the detection accuracy for the fluorescence. According to the present embodiment, the ultraviolet light can be prevented by the ultraviolet light blocking filter 15 from entering the color filter 18, thus making it possible to prevent the amount of the ultraviolet light transmitted through the color filter 18 from varying, and then degrading the detection accuracy for the fluorescence.

Furthermore, according to the present embodiment, the simple configuration obtained just by providing the respective ends of the ultraviolet light blocking filter 15 and color filter 18 at positions shifted from each other in a direction (y direction) parallel to the light-receiving surface 12A allows the second region 122 to be easily formed between the respective ends. Thus, the simple configuration allows the color filter 18 to be reliably prevented from being deteriorated by ultraviolet light.

Furthermore, according to the present embodiment, the respective ends of the ultraviolet light blocking filter 15 and color filter 18 are shifted to the positions in consideration of the aperture angle of the lens array 11, and ultraviolet light that enters the lens array 11 at an angle that allows for reaching the end of the color filter 18 does not pass through the lens array 11. For that reason, the color filter 18 can be reliably prevented from being deteriorated by ultraviolet light.

DESCRIPTION OF REFERENCE SIGNS 10 linear light source
11 lens array
12 light-receiving unit
12A light-receiving surface
13 substrate
14 protective glass
15 ultraviolet light blocking filter
16 housing
17 reflective member
18 color filter
21 illuminance correction system
22 reference data storage unit
23 correction data generation unit
24 illuminance correction unit
24A first image correction processing unit
24B second image correction processing unit
121 first region
122 second region
123 third region

The invention claimed is:

1. An optical linear sensor unit comprising at least: a linear light source including an ultraviolet light source and a visible light source, for use as an illumination light source that illuminates a paper sheet; a lens array that guides a light reflected from the illuminated paper sheet on a reflected light path passing through the lens array; a light-receiving unit that receives, at a light-receiving surface thereof, the light passing through the lens array; a reflective member is disposed on a direct optical path from the linear light source to the lens array, and is positioned within a reading region of the light-receiving unit and is also outside an image region in which the light-receiving unit reads the paper sheet; an ultraviolet light blocking filter is provided closer proximate to the light-receiving unit than the reflective member along the reflected light path, and the ultraviolet light blocking filter blocks ultraviolet light reflected at the reflective member from entering the light-receiving unit; a color filter is provided closer proximate to the light-receiving unit than the ultraviolet light blocking filter along the reflected light path, and the color filter allows visible light in a specific wavelength range reflected at the reflective member to pass through the color filter and enter the light-receiving unit; and the light-receiving surface of the light-receiving unit has (i) a first region that is opposed to the reflective member without the ultraviolet light blocking filter and the color filter interposed therebetween, (ii) a second region that is opposed to the reflective member and the ultraviolet light blocking filter without the color filter interposed therebetween, and (iii) a third region that is opposed to the reflective member, the ultraviolet light blocking filter, and the color filter.

2. The optical linear sensor unit according to claim 1, wherein:
the reflective member further includes two partially reflective members spaced apart and provided at positions that are opposed to each end of each of the ultraviolet light blocking filter and the color filter,
respective ends of the ultraviolet light blocking filter and the color filter are provided at positions shifted from each other in a direction parallel to the light-receiving surface of the light receiving unit; and
the second region of the light-receiving surface is formed between the respective ends of the linear light source.

3. The optical linear sensor unit according to claim 2, wherein:
the lens array has an aperture angle that transmits light incident within a predetermined angle range, and
the respective ends of the ultraviolet light blocking filter and the color filter are provided at positions shifted from each other in a direction parallel to the light-receiving surface, such that a straight line connecting the respective ends is equal to or larger than the predetermined angle range with respect to a direction orthogonal to the light-receiving surface.

4. The optical linear sensor unit according to claim 3, wherein:
the predetermined angle range is 10° to 20°.

5. The optical linear sensor unit according to claim 1, further comprising:
an ultraviolet light reference data storage that stores, as ultraviolet light reference data, an amount of light received in the light-receiving unit in a case where a reference amount of ultraviolet light is reflected at the reflective member to enter the first region; and
a first image correction processor that corrects an image obtained by irradiating the paper sheet with ultraviolet light, based on an amount of ultraviolet light received in the first region of the light-receiving unit, and the ultraviolet light reference data stored in the ultraviolet light reference data storage.

6. The optical linear sensor unit according to claim 1, further comprising:
a visible light reference data storage that stores, as visible light reference data, an amount of light received in the light-receiving unit in a case where a reference amount of visible light is reflected at the reflective member to enter the third region; and
a second image correction processor that corrects an image obtained by irradiating the paper sheet with visible light, based on an amount of visible light received in the third region of the light-receiving censor unit, and the visible light reference data stored in the visible light reference data storage.

7. The optical linear sensor unit according to claim 1, wherein
the linear light source also includes an infrared light source.

8. The optical linear unit according to claim 7, further comprising:
an infrared light reference data storage that stores, as infrared light reference data, an amount of light received in the light-receiving unit in a case where a reference amount of infrared light is reflected at the reflective member to enter the third region; and
a third image correction processor that corrects an image obtained by irradiating the paper sheet with infrared light, based on an amount of infrared light received in the third region of the light-receiving unit, and the infrared light reference data stored in the infrared light reference data storage.

\* \* \* \* \*